March 31, 1953
P. E. ALLEN
COMBINED PROTECTIVE DEVICE AND
GAS DOOR LOCK FOR AUTOMOBILES
Filed May 25, 1950
2,633,369
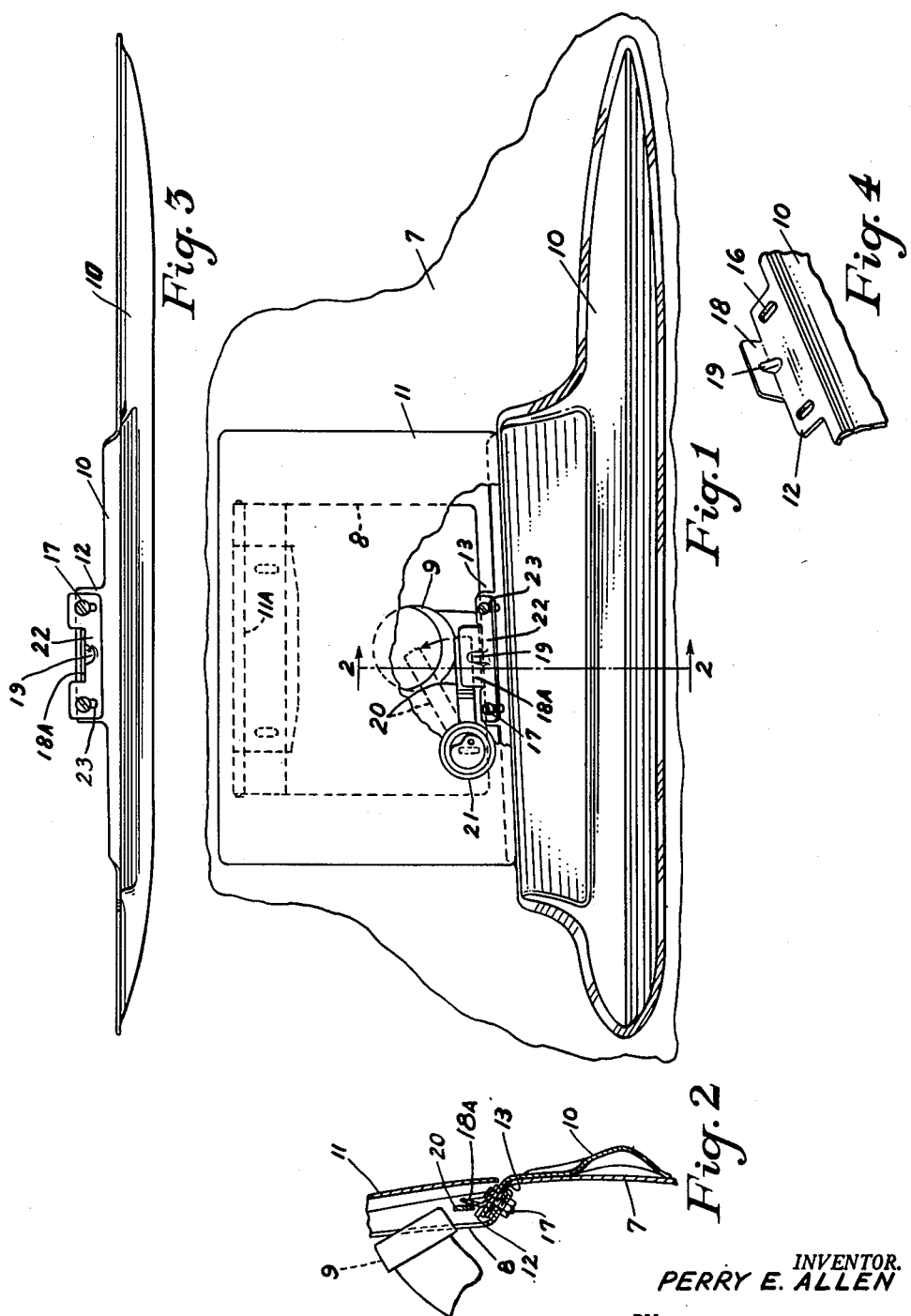
INVENTOR.
PERRY E. ALLEN
BY Edward M. Apple
ATTORNEY Patented Mar. 31, 1953

2,633,369

UNITED STATES PATENT OFFICE 2,633,369

COMBINED PROTECTIVE DEVICE AND GAS DOOR LOCK FOR AUTOMOBILES

Perry E. Allen, Detroit, Mich.

Application May 25, 1950, Serial No. 164,115

4 Claims. (Cl. 280—153)

This invention relates to automotive vehicles, and has particular reference to a protective and locking device for the rear fender opening of an automobile, adjacent the gas tank filler.

An object of the invention is to provide a combined protective shield for the fender and lock for the cover of the opening in an automobile fender through which the gas tank may be filled.

In current models of conventional automobiles, it is customary to support the gas tank at the rear end of the vehicle body, and to provide an opening in one of the rear fenders through which the gas tank filler pipe is made accessible. Such a construction offers numerous difficulties for the owner of the automobile. Oftentimes the rear fender adjacent the filler opening is damaged by the gas station attendant when he rests the gas pump nozzle on the finish of the fender. At other times the gasoline carried in the tank is siphoned out because the filler opening is readily accessible to a thief.

It is, therefore, an object of the invention to provide a combined fender protective shield and lock for the cover plate or door over the gas tank filler opening in the rear fender, which will obviate both of the difficulties indicated above.

The foregoing and other objects and advantages of the invention will become more apparent as the description proceeds, reference being made from time to time to the accompanying drawings, forming part of the within disclosure, in which drawings:

Fig. 1 is a fragmentary detail of an automobile rear fender showing a device embodying the invention mounted thereon.

Fig. 2 is a section taken substantially on the line 2—2 of Fig. 1.

Fig. 3 is a top plan view of the device shown in Fig. 1 without the fender.

Fig. 4 is a fragmentary detail of a modified form of the locking element.

Referring now more particularly to the drawings, it will be understood that in the embodiment herein disclosed, the reference character 7 indicates the rear fender of an automobile having an opening 8, through which the gasoline filler pipe 9 is accessible, and on which is mounted the protective shield 10 and the closure flap or door 11, the latter being hinged to the fender 7 as at 11A.

The protective shield 10 has an inturned flange 12 which is arranged to engage a corresponding member 13 (Fig. 2) formed on the fender 14 along the fender opening 8. The flange 12 is slotted as at 16 (Fig. 4) to accommodate bolts 17, whereby the protective shield is secured to the fender member 13 by much in the manner as disclosed in the United States Letters Patent No. 2,467,001.

Formed integrally with the flange 12 of the protective shield 10, as shown in Figure 4, is an upstanding ear 18 which is reinforced as at 19 and which is adapted to serve as a stop for the locking bar 20 comprising part of the lock assembly 21 which is mounted on the closure flap or door 11. When the locking bar 20 is in engagement with the locking ear 18, the closure flap or door 11 cannot be lifted.

Although I prefer to form the locking ear 18 integrally with the flange 12 of the protective shield, as shown in Fig. 4, it is also within the contemplation of the invention to form the ear 18-A on a removable element 22 (Fig. 1), which removable element is also provided with slots 23 which are adapted to align with the slots 16 formed in the flange 12 of the protective shield 10.

When the ear 18-A is formed on an independent element 22, the element 22 may be adjusted on the flange 12 of the protective shield 10 so that the locking ear 18-A may be brought into closer contact with the locking bar 20. A similar result may be accomplished by bending the ear 18 inwardly when it is formed integrally with the flange 12 as shown in Fig. 4.

Whether the locking ear 18 is formed integrally with the flange 12 of the protective shield 10, or is formed on the removable element 22, the entire area of the protective shield 10, which is in contact with the fender, serves as an abutment which resists any effort or thrust which tends to outwardly displace the ears 18 and 18-A so that the thrust of the locking bar 20 is not all absorbed by the flange 12 or the corresponding member 13 formed on the fender 7.

When the locking bar 20 is elevated to the position shown by the dotted lines in Fig. 1, the closure flap or door 11 may be lifted to make accessible the gas filler pipe 9.

Having described my invention, what I claim and desire to secure by Letters Patent is:

1. In a device of the character described, including a fender having a gas filler opening therein and a hinged flap for covering said opening, the combination of a protective shield secured to said fender at said gas filler opening, said protective shield having an inturned flange with apertures therein arranged to align with an apertured flange formed on said fender, said protective shield having associated with the inturned flange thereof an upstanding locking ear adapted to engage a locking bar carried on said hinged flap.

2. The structure defined in claim 1 in which said upstanding locking ear is formed integrally with the flange of said protective shield.

3. The structure defined in claim 1 in which said upstanding locking ear is formed integrally with an element which is adjustably mounted on the flange of said protective shield.

4. The combination with an automobile fender having a gas filler opening therein and a hinged flap for covering said opening, of a protective shield secured to said fender along said opening, a locking bar secured to said hinged flap and a locking ear carried by the inturned flange of said protective shield.

PERRY E. ALLEN.

REFERENCES CITED

The following references are of record in the file of this patent:

UNITED STATES PATENTS

| Number | Name | Date |
| --- | --- | --- |
| 2,035,895 | Kelly | Mar. 31, 1936 |
| 2,197,328 | Wilson | Apr. 16, 1940 |
| 2,282,443 | Wilson | May 12, 1942 |
| 2,417,324 | Rivard et al. | Mar. 11, 1947 |
| 2,467,001 | Allen | Apr. 12, 1949 |